Patented Dec. 23, 1924.

1,520,054

UNITED STATES PATENT OFFICE.

ADOLF DULITZ, OF HIRSCHBERG, GERMANY.

PROCESS FOR THE MANUFACTURE OF SEALING CAPS AND FOR APPLYING THEM ON TO THE VESSELS TO BE SEALED.

No Drawing. Application filed May 5, 1924. Serial No. 711,247. REISSUED

To all whom it may concern:

Be it known that I, ADOLF DULITZ, a citizen of the German Republic, and residing at 25 Steinstrasse, Hirschberg, Silesia, Germany, have invented a certain new and useful Process for the Manufacture of Sealing Caps and for Applying Them on to the Vessels to be Sealed, for which I filed an application in Germany on Nov. 28, 1922, and of which the following is a specification.

Dry tightly fitting capsules made of acetylcelluose and a water-soluble softening agent have already been proposed, which have been used by drawing the drying elastic pellicle on to the vessel to be closed and then immersing it in water. An exchange of softening agents and water thereupon takes place, so that after drying the pellicle is caused to lie closely against the vessel to be sealed.

Owing to the manner in which they are made and used, the pellicles cannot have less than a certain minimum thickness and necessitate the use of a corresponding amount of raw material. This raw material is however very expensive and it is of great importance to reduce the quantity used as far as possible.

This is effected by the exchange of softening agent and water being caused to take place not after the pellicle has been placed in position on the vessel to be sealed, but on the glass former, on which it is made.

When the correct softening agents are chosen, a change takes place in the swelling of the pellicle by treating the pellicle on the glass former with water, on the softening agent being exchanged for water and the two having a certain proportion to one another, which change so alters its mass and its strength, that quite thin pellicles may be stripped from the former without being damaged. This behavior makes it possible for the pellicle made from the acetyl cellulose solution mixed with the softening agent to have only a fraction of the thickness that would be required, if it were stripped in the soft state from the glass former without previous treatment with water. The saving in the very expensive acetyl cellulose and its homologues thus effected is very considerable and results in the cost of the new capsules being only a fraction of that of the capsules made according to German Patent 364,397 (Klasse 64ª, gr. 20). The capsules made according to the present method are sufficiently durable when in a moist state, may be dyed in exactly the same manner as those made by the older method or may be mixed with metallic powders. According to the present invention only those softening agents are suitable, which when dissolved out on the glass former leave the acetyl cellulose in a swelled state, but which do not precipitate. A suitable softening agent is for instance the acetin referred to in German Patent 364,397, but unsuitable agents are phenols and substituted phenols, which would alone or mixed with water act as solvents of acetyl cellulose and would not allow of a swelled, sufficiently mechanically strong pellicle being formed. The so-called chloroform-soluble acetyl cellulose or a glacial acetic solution of acetyl cellulose is also unsuitable as the new material for the new capsule capable of being mixed with metallic powder, as the substance before the treatment with water must be a swelled acetyl cellulose free from solvent.

The water-containing, moist pellicles made according to the present invention are so strong that they can be readily drawn on to the vessel to be sealed. On drying they then shrink to such an extent that a perfectly tight sealing of the vessel is ensured.

Wet pellicles of viscose have also been proposed, which are placed on the vessels to be sealed and are stated to make a tight seal on becoming dry. These known viscose capsules can however not be made in the way described above and therefore entail the use of a correspondingly greater amount of raw material. They are also less durable in the moist state, easily become mouldy and must therefore always be treated with special preservatives. Lack of proper care on the part of the user may easily result in their being completely destroyed and becoming useless.

These disadvantages are entirely overcome when using the acetyl cellulose suggested above. The use of acetyl cellulose has the further great advantage for the particular purpose of the manufacture of bottle capsules and similar seals, that dye stuffs of any kind can be added to them, when in solution, which makes it possible to make capsules having two or more colours, which have completely the character of metal. Impressions of any kind may be made on these capsules, so that they provide the best possible protection against the contents of the bottles being exchanged and therefore the best trademark protection.

What I claim is:—

A process for obtaining a sealing cover consisting in mixing with acetyl cellulose a water-soluble softening agent, forming therefrom a pellicle on a former and in treating the pellicle while on the former with water, for the purpose of causing an exchange of the softening agent for water to take place and of causing only a slight swelling of the pellicle.

In testimony whereof I have signed my name to this specification.

ADOLF DULITZ.

Witnesses:
H. CROFT.
C. LANGE.